US008238865B2

(12) United States Patent
Chanca et al.

(10) Patent No.: US 8,238,865 B2
(45) Date of Patent: Aug. 7, 2012

(54) IMAGE CALIBRATION AND CORRECTION FOR LOW-IF RECEIVERS

(75) Inventors: Miguel Chanca, Valencia (ES); Ronan Casey, Cork City (IE); Patrick Crowley, Mungret (IE); Muhammad Khan, Douglas (IE); Philip Quinlan, Glounthaune (IE)

(73) Assignee: Analog Devices, Inc., Norwood, MA (US)

( * ) Notice: Subject to any disclaimer, the term of this patent is extended or adjusted under 35 U.S.C. 154(b) by 328 days.

(21) Appl. No.: 12/576,630

(22) Filed: Oct. 9, 2009

(65) Prior Publication Data

US 2011/0086605 A1 Apr. 14, 2011

(51) Int. Cl.
*H04B 1/10* (2006.01)
(52) U.S. Cl. ...................... 455/302; 455/232.1; 455/296
(58) Field of Classification Search ............... 455/232.1, 455/296, 334, 302
See application file for complete search history.

(56) References Cited

U.S. PATENT DOCUMENTS

| 4,710,737 | A | 12/1987 | Matsuta |
| 7,149,488 | B2 | 12/2006 | Khorram |
| 7,373,124 | B2 | 5/2008 | Okanobu |
| 2004/0002318 | A1 | 1/2004 | Kerth et al. |
| 2004/0005869 | A1 | 1/2004 | See et al. |
| 2005/0069056 | A1 | 3/2005 | Willingham |
| 2005/0070236 | A1 | 3/2005 | Paulus |
| 2005/0070239 | A1 | 3/2005 | Paulus |
| 2005/0180528 | A1 | 8/2005 | Manku |
| 2005/0186932 | A1 | 8/2005 | Kurimoto et al. |
| 2006/0068739 | A1 | 3/2006 | Maeda et al. |
| 2007/0072571 | A1 | 3/2007 | Sun et al. |
| 2007/0099570 | A1 | 5/2007 | Gao et al. |
| 2007/0222492 | A1 | 9/2007 | Cafaro et al. |
| 2008/0130800 | A1 | 6/2008 | Maxim et al. |
| 2008/0132191 | A1* | 6/2008 | Quinlan et al. ............... 455/302 |

OTHER PUBLICATIONS

Der et al., "A 2-GHz CMOS Image-Reject Receiver With LMS Calibration", *IEEE Journal of Solid-State Circuits*, IEEE, vol. 38 No. 2, pp. 167-175 (Feb. 2003).
Elahi et al., "I/Q Mismatch Compensation Using Adaptive Decorrelation in a Low-IF Receiver in 90-nm CMOS Process", *IEEE Journal of Solid-State Circuits*, IEEE, vol. 41 No. 2, pp. 395-403 (Feb. 2006).
Elmala et al., "Calibration of Phase and Gain Mismatches in Weaver Image-Reject Receiver", *IEEE Journal of Solid-State Circuits*, IEEE, vol. 39 No. 2, pp. 283-289 (Feb. 2004).
Hajirostam et al., "An Analog-Digital Adaptive Image-Reject Technique for Quadrature Receivers", *ECCTD*, (Aug./Sep. 2005).

* cited by examiner

*Primary Examiner* — Christian Hannon
(74) *Attorney, Agent, or Firm* — Knobbe Martens Olson & Bear LLP

(57) ABSTRACT

Embodiments of a system for calibrating the image rejection of a receiver include an image-rejection correction circuit that modifies the gain and phase of a first channel of a baseband image signal. The image-rejection correction circuit may include a summing circuit and first and second variable-gain elements. In one implementation, a filter receives a corrected first channel from the image-rejection correction circuit and an unmodified second channel of the image signal, while a controller analyzes power measured at the output of the filter, and adjusts the variable-gain elements to reduce the power of the image signal.

24 Claims, 16 Drawing Sheets

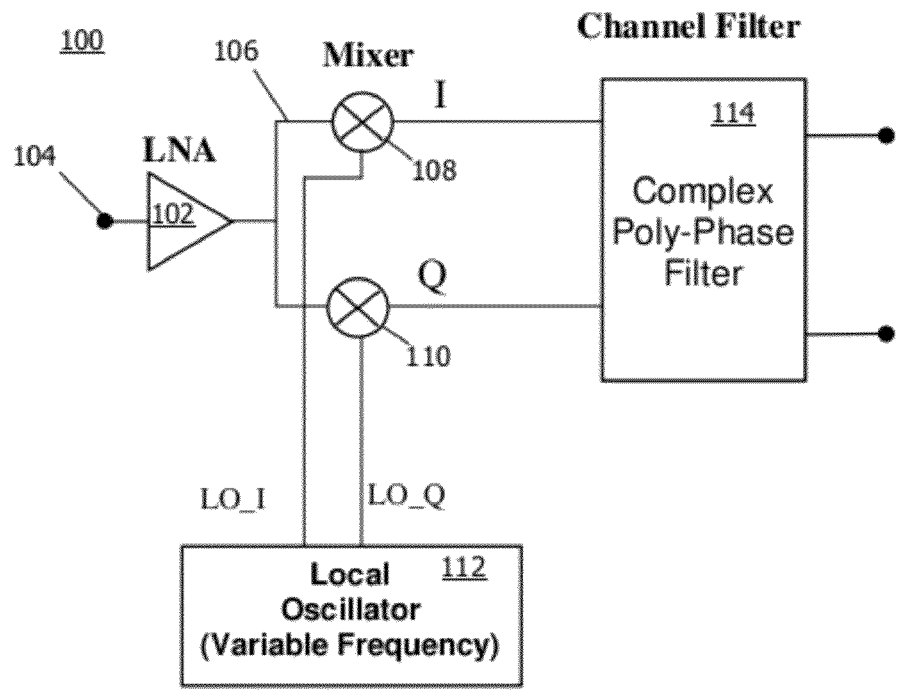
FIG. 1 – PRIOR ART
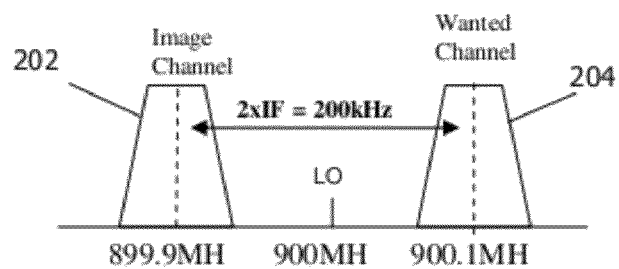
FIG. 2A – PRIOR ART
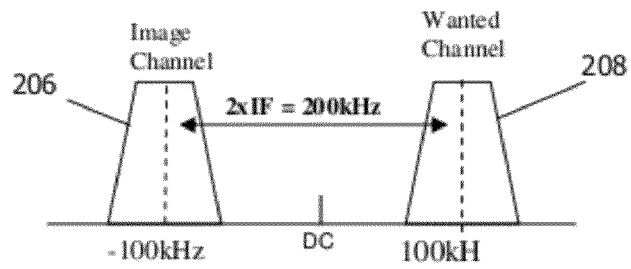
FIG. 2B – PRIOR ART

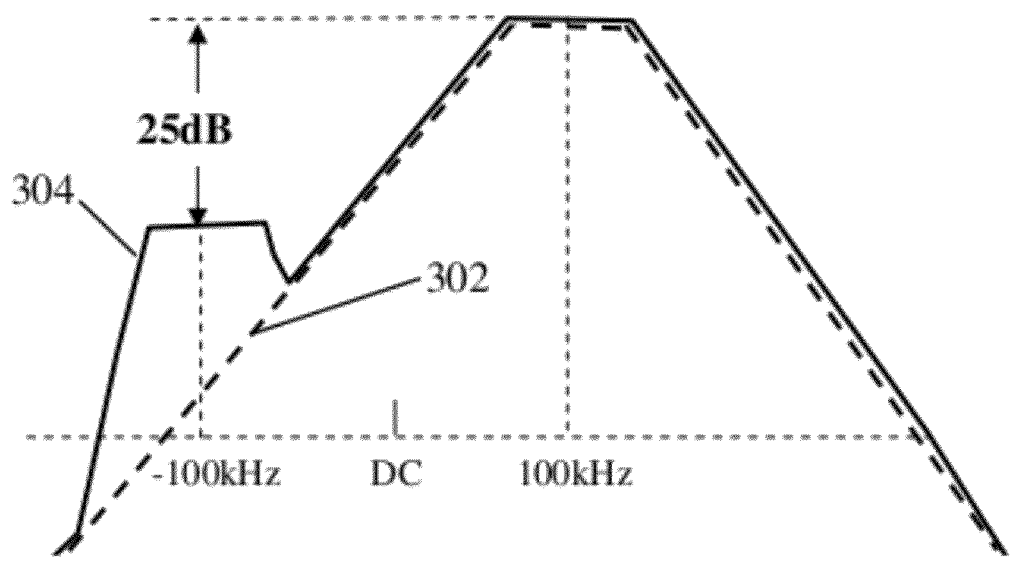
FIG. 3 – PRIOR ART
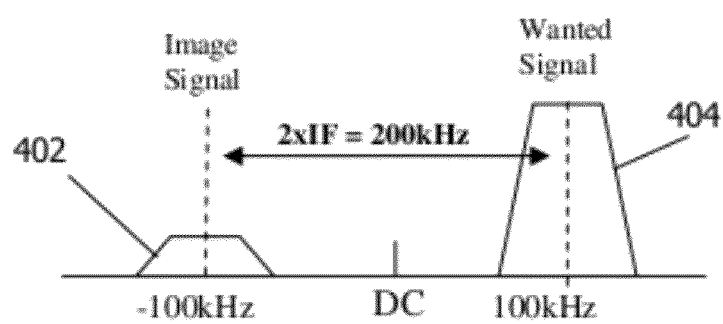
FIG. 4 – PRIOR ART

IMAGE CALIBRATION AND CORRECTION FOR LOW-IF RECEIVERS

TECHNICAL FIELD

Embodiments of the current invention relate to image rejection calibration systems and methods for a radio-frequency receiver.

BACKGROUND

In radio reception using heterodyning in the tuning process, the "image frequency" is an undesired input frequency capable of producing an intermediate frequency ("IF") similar to that of the desired input frequency. It is a potential source of interference to proper reception. Accordingly, achieving good image rejection ("IR") in heterodyne receivers is one of the most important challenges in high-performance radio-frequency ("RF") design, and, as a result, the choice of radio architecture used in many applications is often dictated by an application's overall IR requirements. One possible radio architecture uses a zero-IF receiver, which has no image component requiring rejection. The zero-IF architecture is, however, prone to DC offset problems and to low-frequency impairments, such as 1/f noise. These problems render the zero-IF architecture unsuitable for narrowband wireless communication applications, narrowband wireless telemetry, and wireless sensor applications. For example, narrowband wireless communication applications, such as those using the Flex/ReFlex pager and PMR radio standards, require low-frequency occupied spectral bandwidths of 6.25 kHz, 12 kHz, and 25 kHz. Similarly, various regulatory agencies (e.g., FCC in the United States, ETSI in Europe, and ARIB in Japan) permit narrowband wireless telemetry only in selected RF bands (for example, 6.25-25 kHz in the United States and 12.5-25 kHz in Europe and Japan). A zero-IF receiver architecture may be unsuitable for these low-frequency, narrowband applications.

Another radio architecture uses a double superheterodyne to achieve good IR performance. In this architecture, the use of a high first IF frequency may relax the constraints on the RF band-select filter at the low noise amplifier ("LNA") input and thereby improve IR performance. High-IF receivers, however, generally require expensive and power-hungry filters for the first IF stage, rendering them unsuitable for low-power applications.

A double-superheterodyne receiver may use a low first IF frequency to relax the bandwidth, power, and cost constraints on the first IF filter. These receivers, however, require a sharper RF band-select filer at the LNA input. A low-IF receiver architecture overcomes the low-frequency and 1/f noise problems of the zero-IF receiver by moving the received spectrum away from DC. As a result, this receiver architecture is more suitable for the narrowband wireless telemetry applications described above. Unlike the zero-IF receiver, however, a low-IF receiver includes a complex mixer or poly-phase filter to reject the generated image frequency. In general, traditional low-IF receivers rely on complex signal cancellation techniques to remove the image component. Due to manufacturing process tolerances, however, it is difficult to ensure quadrature gain and phase errors of better than 1-2% and 1-3 degrees, respectively, which results in a typical image rejection performance of 25-30 dB.

Some low-IF receivers improve their image rejection performance with image-calibration circuitry, which attempts to compensate for the gain and phase errors caused by manufacturing process tolerances in the receiver's components. Conventional calibration circuits, however, suffer from numerous drawbacks. Phase and/or gain adjust circuits that operate at RF frequencies consume a significant amount of power and are difficult to design with a wide dynamic range. Digital phase and/or gain adjust circuits may be implemented to operate at baseband or IF frequencies, but they typically require at least four multipliers to operate—with associated area and power penalties—and incur an inherent loss in precision due to the digitization of the analog RF signal. Thus, there is a need for a robust, low-cost, and low-power image-calibration circuit for RF receivers.

SUMMARY

In general, various aspects of the systems and methods described herein relate to a robust, low-cost, and low-power image-calibration circuit for a RF receiver. The image-calibration circuit may operate completely at baseband frequencies, thereby relaxing constraints on power consumption and component precision. Furthermore, in various embodiments, the image-calibration circuit uses an analog approach to cancelling out imperfections in the baseband I and Q channel vectors that involves only two multipliers. By performing the calibration in the analog domain, the size and complexity of the image-calibration circuit is reduced while its robustness and range are increased. Further increases in power savings and design area may be conferred by improvements to the digital circuitry that controls the analog components.

In general, in one aspect, a system for calibrating image rejection of a receiver includes an analog circuit element, an image-rejection filter, a power measurement circuit, and a controller. The analog circuit element modifies the gain and phase of a baseband image signal in accordance with a received control signal so as to produce a corrected image signal. The image-rejection filter receives the corrected image signal and produces a filtered image signal based thereon. The power measurement circuit determines a power level of the filtered image signal, and the controller analyzes the power level and alters the control signal based on the power level analysis, thereby reducing the power level of the filtered image signal.

In various embodiments, a decoder receives gain and phase values and for generating the control signal. The decoder may include a look-up table (and may extrapolate between entries therein), and may be bypassed with a decoder bypass circuit. The controller may include a gradient estimation algorithm, which may include an adaptive step size. The analog circuit element may include a passive analog multiplier, which may include a three-state, n-bit R2R resistor ladder. The analog circuit element may receive a reference frequency a crystal oscillator, a programmable clock divider, an RF synthesizer, and/or a heterodyne circuit. A frequency source may provide a calibration signal, and may include a digital divider, a high-pass filter, and/or a band-pass filter. A mixer may mix the calibration signal with a local oscillator signal, thereby producing the image signal. The image-rejection filter may be a poly-phase filter.

In general, in another aspect, a system for calibrating image rejection of a receiver includes an image-rejection correction circuit (including first and second variable-gain elements and a summing circuit), an image-rejection filter, a power measurement circuit, and a controller. The image-rejection correction circuit modifies the gain and phase of a first channel of a baseband image signal. The first variable-gain element receives the first channel of the image signal and generates a first correction signal in accordance with a received control signal. Similarly, the second variable-gain element receives a second channel of the image signal and generates a second correction signal in accordance with the received control signal. The summing circuit sums the first channel, first correction signal, and second correction signal, thereby generating a corrected first channel of the image signal. The image-rejection filter receives the corrected first channel of the image signal and the second channel of the image signal and produces a filtered image signal. The power measurement circuit determines a power level of the filtered image signal, and the controller analyzes the power level and alters the control signal based on the power level analysis, thereby reducing the power level of the filtered image signal.

In various embodiments, the first channel of the image signal may be an I channel or a Q channel. The first and second variable-gain elements may include a passive analog multiplier. The R2R resistor ladder may be a three-state, n-bit R2R resistor ladder.

In general, in yet another aspect, a method for calibrating image rejection of a receiver begins with sensing a power level of an filtered image signal produced by an image-rejection filter. A control signal is generated based on the power level of the filtered image signal. An analog circuit element (which receives a baseband image signal and produces a corrected image signal) is modified in accordance with the control signal. The corrected image signal is received at the image-rejection filter, and modifying the analog circuit element reduces the power level of the filtered image signal.

In various embodiments, generating the control signal may include estimating the gradient of the power level, looking up a value in a look-up table, and/or extrapolating between look-up table entries. Estimating the gradient may include adapting a step size.

In general, in still another aspect, an electronic device includes an RF receiver having a system for calibrating image rejection. The receiver includes an analog circuit element, an image-rejection filter, a power measurement circuit, and a controller. The analog circuit element modifies the gain and phase of a baseband image signal in accordance with a received control signal so as to produce a corrected image signal. The image-rejection filter receives the corrected channel image signal and produces a filtered image signal based thereon. The power measurement circuit determines a power level of the filtered image signal. The controller analyzes the power level and alters the control signal based on the power level analysis, thereby reducing the power level of the filtered image signal.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 1 is a schematic diagram of a prior-art low-IF receiver;
FIGS. 2A and 2B graphically illustrate an unwanted image signal and wanted RF signal;
FIG. 3 graphically illustrates a poly-phase filter rejection profile;
FIG. 4 graphically illustrates a filtered image signal and wanted RF signal.

DETAILED DESCRIPTION

Figure 5:
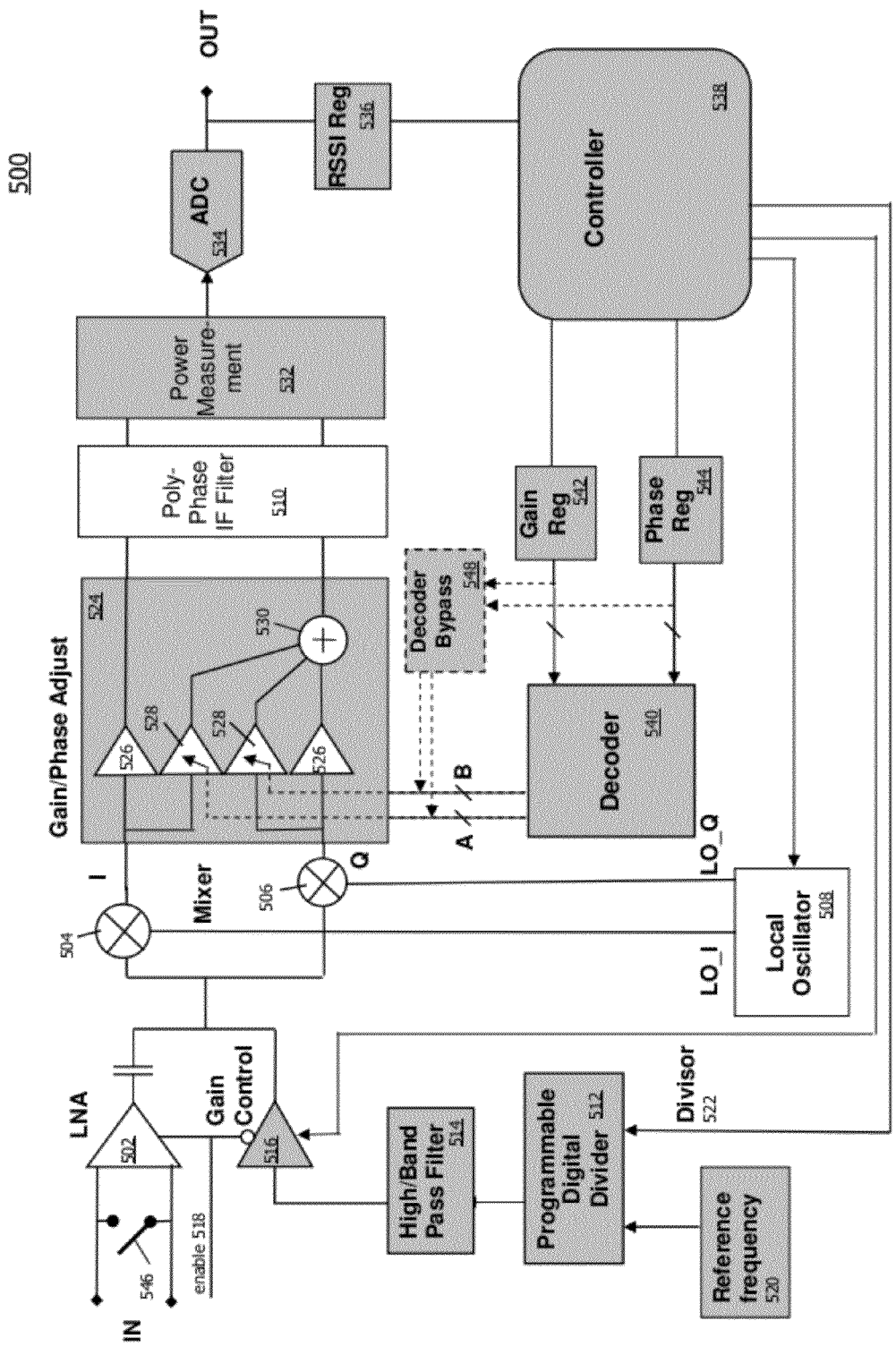
FIG. 5 is a schematic diagram of an RF receiver featuring an image calibration system.

Described herein are various embodiments of methods and systems for robust, low-power, low-cost image calibration systems for RF receivers. FIG. 1 illustrates an example of a typical, uncalibrated low-IF receiver 100. A low-noise amplifier 102 receives an input signal 104 and provides an RF 106 signal to quadrature mixers 108, 110. A local oscillator 112 generates signals LO_I, LO_Q for the quadrature mixers 106, 108, which mix the RF 106 signal and the local oscillator signals LO_I, LO_Q to produce IF signals I, Q. In one embodiment, the RF signal oscillates at 900.1 MHz, the local oscillator at 900 MHz, and the IF signal at 100 kHz. An unwanted image frequency may thus appear at 899.9 MHz (i.e., the frequency of the incoming RF signal minus two times the IF frequency). In another embodiment, a local oscillator frequency of 900.2 MHz may be mixed with the incoming 900.1 MHz RF signal to produce a 100 kHz IF signal; in this embodiment, the image frequency is 900.3 MHz. Other RF frequencies may be selected by varying the frequencies of the signals LO_I, LO_Q output from the local oscillator 112. The outputs I, Q of the quadrature mixers 108, 110 are then sent to a complex poly-phase filter 114. Further examples of image rejection calibration systems are described in U.S. Patent Application Publication No. 2008/0132191, which is hereby incorporated by reference in its entirety.

FIG. 2A illustrates the unwanted image input signal 202 and wanted IF input signal 204 as they appear at the output of low noise amplifier 102, which amplifies both signals substantially equally. The unwanted image input signal 202 may appear at the same or even at a higher power level than the wanted IF input signal 204. Similarly, FIG. 2B illustrates the unwanted image input signal 206 and the wanted IF input signal 208 as they appear at the outputs of the quadrature mixers 108, 110. The unwanted image input signal 206 may have the same or higher power than the wanted IF input signal 208.

FIG. 3 illustrates an ideal symmetrical rejection profile 302 for the complex poly-phase filter 114. The rejection profile 302 is centered on the wanted IF channel (100 kHz) and attenuates the unwanted image channel (−100 kHz). The actual rejection profile, however, may be less than ideal due to, for example, manufacturing process tolerances. A typical rejection profile 304 does not perfectly reject the unwanted image channel at −100 kHz. In one embodiment, the unwanted image signal is attenuated by only 25 dB.

FIG. 4 illustrates the output of a poly-phase filter 114 having a typical rejection profile 304. The unwanted image signal 402 is attenuated with respect to the wanted IF signal 404 but not eliminated. If the power level of the unwanted image signal 402 increases by, for example, 25 dB or more (relative to the wanted IF input signal 404), the power level of the unwanted image signal 402 will become comparable to, or greater than, the wanted IF input signal 404. In this case, the unwanted image input signal 402 may cause a substantial degradation in the receiver's performance and inhibit reception of the wanted IF input signal 404.

FIG. 5 illustrates an RF receiver circuit 500 that includes an image-rejection calibration system in accordance with embodiments of the current invention. Although the RF receiver circuit 500 is illustrated using single-ended input and output signals, differential signals may instead be used at some or all points in the circuit. The RF receiver 500 includes a low-noise amplifier 502 for receiving an RF input signal IN; mixers 504, 506; a local oscillator 508; and a poly-phase filter 510, and produces a baseband output signal OUT. Each of these components performs functions similar to those described above with reference to similar components in FIGS. 1-4. The low-noise amplifier 502 is shown with differential inputs. The local oscillator 508 may be implemented using a fractional-N synthesizer, an integer-N RF synthesizer, or any other RF synthesizer known in the art. In various embodiments, the poly-phase filter 510 is a fourth- or fifth-order complex poly-phase filter, but any filter with an order greater than one may be used.

The RF receiver circuit 500 contains additional components for performing an image rejection calibration, shown as shaded boxes in FIG. 5. A programmable digital divider 512, a high-pass or band-pass filter 514, and a gain control circuit 516 together produce a variable RF frequency, as described in more detail below. In one embodiment, the high-pass/band-pass filter 514 and gain control circuit 516 are combined into a single circuit. An enable signal 518 selects either the incoming RF signal at the output of the LNA 502 (during normal operation of the receiver 500) or the generated RF frequency (during a calibration mode). In one embodiment, a shunting switch 546 spans the differential inputs of the LNA 502 and, when enabled, prevents external signals from interfering with the RF receiver 500 during the calibration mode. A reference frequency 520 is provided by, for example, a crystal oscillator, a harmonic of a programmable clock divider, an RF synthesizer, a heterodyne circuit, and/or other frequency source. The digital divider 512 receives the reference frequency 520, divides it in accordance with a programmable divisor 522, and produces a square-wave signal. In other embodiments, the digital divider 512 increases the frequency of the reference frequency 520 or uses it unmodified.

The high-pass/band-pass filter 514 attenuates the low-frequency components of the square-wave signal, permitting only certain high-frequency harmonics of the output square-wave signal to pass. The gain control circuit 516 may adjust the signal level of the filtered signal in accordance with a received control signal to ensure that the filtered signal does not saturate the mixers 504, 506. In addition, the gain control circuit 516 may permit IR calibration over a wide range of signal levels, thereby optimizing the IR performance of the receiver 500 over the maximum and minimum power levels of the external interfering image signal. In various embodiments, the gain control circuit 516 adjusts a coupling capacitor in the high-pass/band-pass filter 514 and/or changes a buffer drive strength in the high-pass/band-pass filter to change the gain of the filtered signal. The output of the gain control circuit 516 is applied to the inputs of the mixer 504, 506. In one embodiment, the output of the gain control circuit 516 is applied to the input of the LNA 502.

A gain and phase adjust circuit 524 adjusts the I and Q channel outputs of the mixers 504, 506 before they are received by the poly-phase filter 510, as explained in more detail below. The gain and phase adjust circuit 524 may include fixed-gain elements 526 and variable-gain elements 528. In one embodiment, the fixed-gain elements 526 are buffers, resistors, and/or constant-gm amplifiers and the variable-gain elements 528 are multipliers or variable amplifiers. A summing circuit 530 sums the output of a fixed-gain element 526 with the outputs of the variable-gain element 528 to produce a modified channel signal.

The power levels of the signals produced by the poly-phase filter 510 may be sensed by a power measurement circuit 532, which may include a logarithmic amplifier and/or a limiter, and converted to a digital signal by an analog-to-digital converter ("ADC") 534. The power level or received signal strength indicator ("RSSI") may be stored in an RSSI register 536. A digital controller 538 receives the output of the RSSI register 536 and, as explained further below, computes gain and phase values necessary to adjust the gain and phase of the IF signal. The digital controller 538 outputs the gain and phase values to a decoder 540 via gain and phase registers 542, 544. The decoder 540, as explained in more detail below, decodes the gain and phase values into amplifier control signals for the gain and phase adjust circuit 524. In one embodiment, the decoder is bypassed with a decoder bypass circuit 548.

In one embodiment, the ADC 534 is a twelve-bit ADC, but the ADC 534 of the present invention is not limited to any particular bit size. The digital controller 538 may be an off-chip microprocessor or microcontroller, such as a digital signal processor ("DSP") or field programmable gate array ("FPGA"), or an on-chip dedicated hardware circuit. In one embodiment, an on-chip digital controller 538 does not require registers such as the RSSI register 536, gain register 542, and phase register 544.

Figure 6:
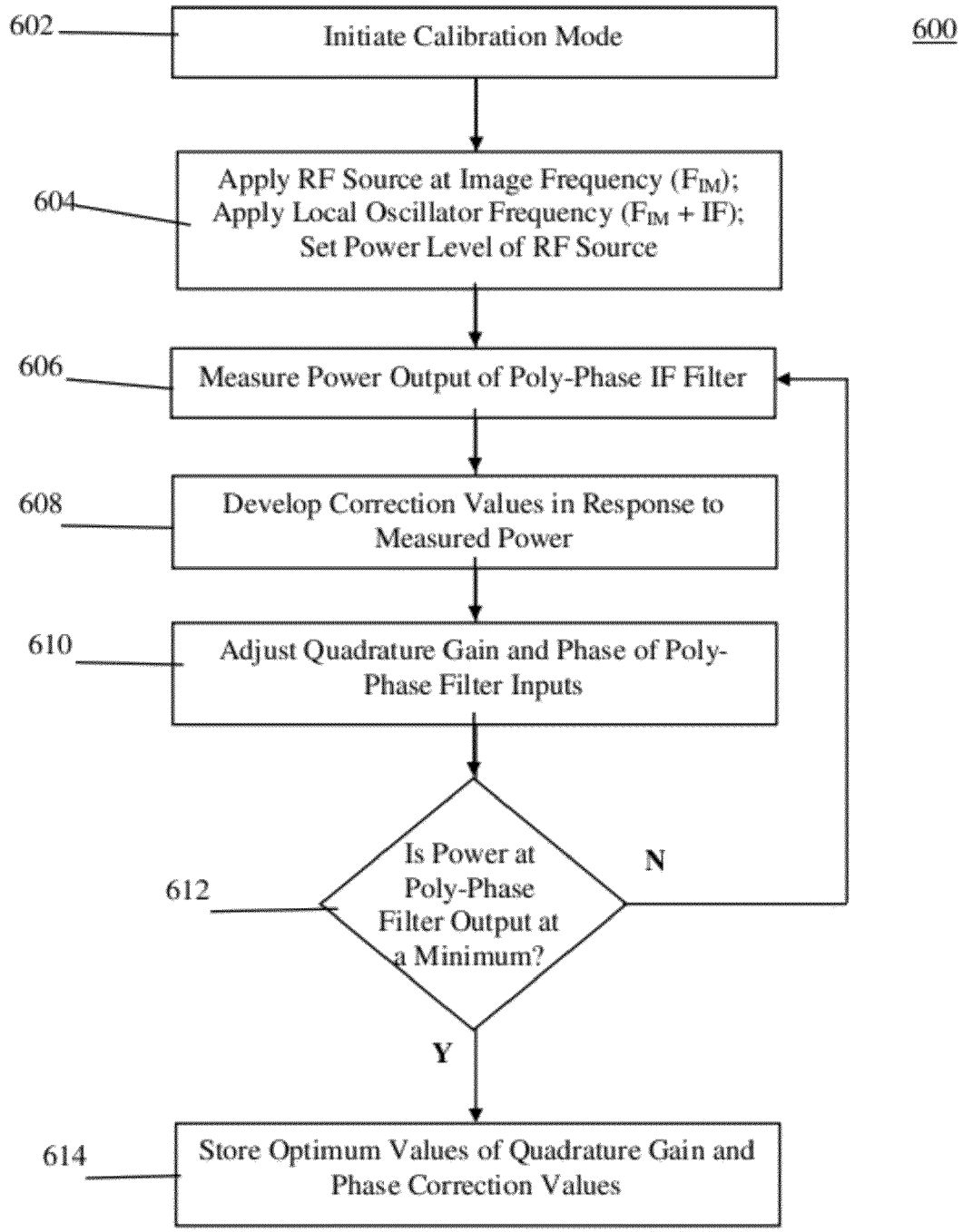
FIG. 6 is a flow chart of a method for performing an image calibration method.

FIG. 6 illustrates a method 600 for performing an image rejection calibration. In brief overview, the calibration mode is initiated (Step 602) and the frequencies of the digital divider 512 and local oscillator 508 are configured (Step 604). The power output from the poly-phase filter 510 is sensed (Step 606) and the controller 538 computes correction values (Step 608) to adjust the phase and gain of the quadrature signals delivered to the poly-phase filter 510 (Step 610). The process repeats until the power of the output of the poly-phase filter 510 is minimized (Step 612) and the optimum values are stored (Step 614).

In greater detail, the calibration mode is initiated (Step 602) by asserting the enable signal 518. The enable signal 518 may be asserted by an external source or by the digital controller 538. In one embodiment, the enable signal 518 is asserted during a power-on calibration cycle. The enable signal 518 may also be asserted periodically to re-calibrate the receiver 500 due to, for example, changes in temperature or supply voltage. The assertion of the enable signal 518, as described above, causes a signal from the gain control circuit 516 to be input to the quadrature mixers 504, 506 instead of the signal from the low noise amplifier 502.

The controller 538 then configures the digital divider 512, gain control circuit 516, and local oscillator 508 for calibration mode (Step 604). In general, the signal from the digital divider 512 is selected to lie in the same frequency range as the image and wanted RF signals. With the generated RF signal so selected, the quadrature signals at the output of the mixer 504, 506 may contain a signal representing the image component at a suitable IF frequency (e.g., −100 kHz).

More specifically, the controller 538 programs the digital divider 512 input with a divisor 522 such that a harmonic of the output of the digital divider 512 frequency is close to the RF band of operation of the receiver 500. The controller 538 also programs the local oscillator 508 so that its output frequency is equal to the sum of the frequency of the RF source plus the receiver's IF frequency. The mixers 504, 506, receiving the local oscillator frequency and the generated RF frequency, will thus produce a frequency equal to the frequency of the unwanted image signal at, e.g., the difference of the two input frequencies. Note that this description corresponds to upper-side injection in an image rejection receiver, in which the desired RF frequency is greater than the LO frequency. In another embodiment, the desired frequency is less than the LO frequency (i.e., lower-side injection), and the LO frequency during calibration is placed at the RF tone minus the IF.

As an example, the incoming (desired) RF frequency may be 905 MHz and the reference frequency 520 may be 10 MHz. The digital divider 512 may be programmed to divide the reference frequency by two, producing a 5 MHz square-wave output. This 5 MHz signal includes a low-level spectral component at the $181^{st}$ harmonic that oscillates at 905 MHz. The high-pass/band-pass filter 514 isolates this component, and the gain control circuit 516 adjusts its level as appropriate. The controller 538 adjusts the local oscillator 508 to produce an output at 905.1 MHz. Thus, the quadrature signals at the output of the mixers 504, 506 contain a signal representing the image component at −100 kHz IF frequency. In other embodiments, different RF bands and/or different RF frequencies are supported by changing the programmable divider factor 522 and selecting an appropriate harmonic frequency close to the RF frequency of operation of the receiver with the local oscillator 508. RF frequencies ranging from few tens of megahertz to several gigahertz may thus be calibrated. In another embodiment, the frequency of the local oscillator 508 may be adjusted to be below the desired frequency (at, e.g., 904.9 MHz), and a similar calibration is performed.

Next, the power output of the poly-phase filter 510 is measured (Step 606) with the power measurement circuit 532. Because the primary input to the poly-phase filter 510 is a signal at the frequency of the unwanted image signal, the power level of the output of the poly-phase filter 510 is a measure of how well the image frequency is being attenuated. For example, a lower measured power level means that the poly-phase filter 510 has more successfully attenuated the image frequency. The power level or RSSI value is converted to a digital signal by the ADC 534 for later digital processing and, if necessary, is stored in the RSSI register 536.

The digitized power level is analyzed and new control values for the gain and phase adjust circuit 524 are computed, if necessary (Step 608). In brief overview, the current power level measurement is compared to a previous measurement or measurements to determine in which direction the gain and phase values should be moved. For example, if a previous increase in the phase value resulted in a reduction of the image signal power level, the phase value is further increased. A more detailed explanation of the gain and phase value computation is below.

Once the new gain and phase values are computed, they are used to adjust the gain and phase of the output of the mixers 504, 506, if necessary (Step 610). As explained further below, the gain and phase adjust circuit 524 contains variable-gain amplifiers 528 controllable by coefficients A, B. The decoder 540 computes the values of the coefficients A, B based on the gain and phase values computed by the controller 538 to adjust the magnitude and phase of either the I or Q signals output from the mixers 504, 506. The adjusted signal compensates for imperfections introduced by, for example, non-ideal components in the mixers 504, 506, poly-phase filter 510, and/or LO.

If the power level of the output of the poly-phase filter 510 is not at a minimum, the power level is re-measured and the process repeats (Step 612). If, however, the power level is at a minimum level (i.e., any change in the gain and phase values produces an increase in output power), the optimum values are stored and the calibration process ends (Step 614). The calibration procedure may improve the image rejection of the RF receiver 500 from approximately 25 dB to typically 50-60 dB, but is not restricted to these values.

Figure 7:
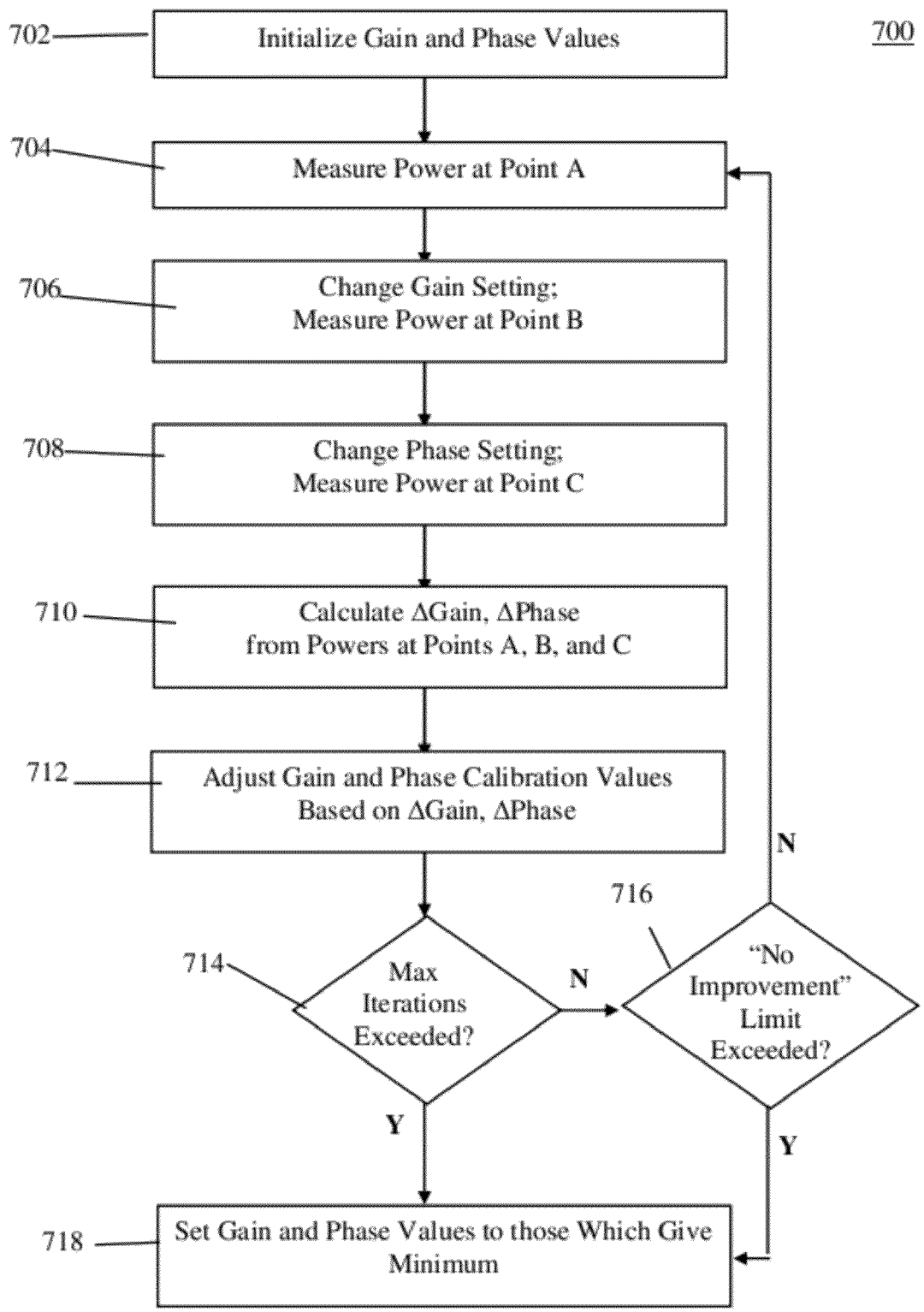
FIG. 7 is a flow chart of an algorithm for gradient estimation.

FIG. 7 illustrates one embodiment of a gradient estimation algorithm 700 for computing new control values for the gain and phase adjust circuit 524, in accordance with Step 608. In general, the gradient estimation algorithm computes gain and phase correction values through an iterative, intelligent search of a two-dimensional array of possible gain and phase values. Each location in the two-dimensional array represents the poly-phase filter output power associated with the gain and phase values at that location. In each iteration, the algorithm 700 calculates the localized slope or gradient of power output measurements at a point A in the two-dimensional array, and each iteration moves the point A closer to the optimum gain and phase adjustment values.

Figures 8A, 8B:
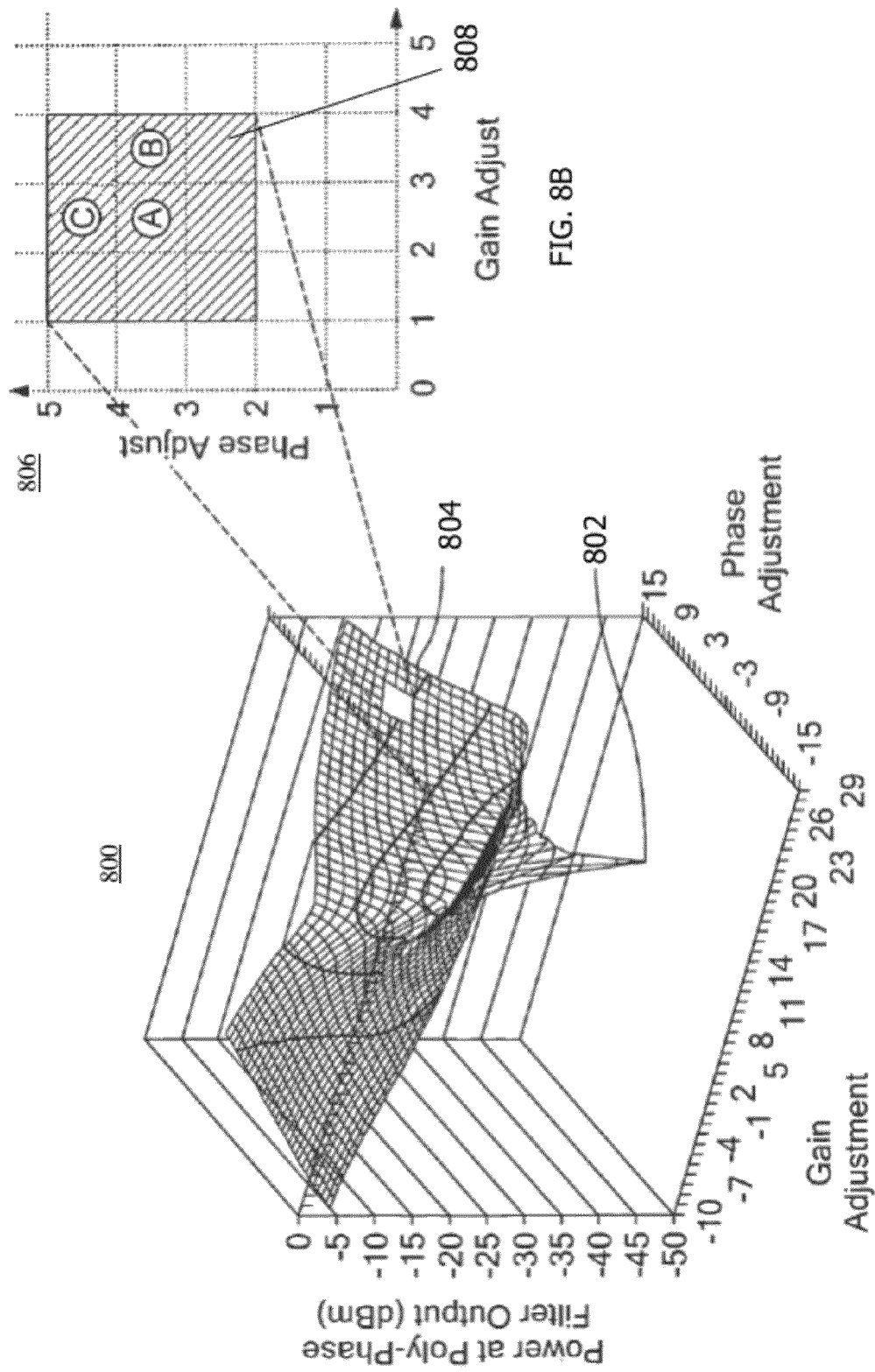
FIGS. 8A and 8B are three-dimensional and two-dimensional illustrations, respectively, of an output signal power.

Referring briefly to FIG. 8A, a three-dimensional graphical representation 800 of a range of filter output powers is illustrated, in one embodiment, for a range of gain and phase adjustment values. A minimum power level occurs at a bottommost point 802, which corresponds to the point of maximum image rejection. The representation 800 illustrates output power for particular ranges of input gain and phase adjustment, but the current invention is not limited to any particular range of input values. In various embodiments, the input gain and phase adjustment values may be changed to any appropriate values that locate the minimum power level 802. A portion 804 of the three-dimensional graph is shown as a two-dimensional array 806 in FIG. 8B. The point A is shown on the two-dimensional array 806, as well as nearby points B and C.

Returning to FIG. 7, the algorithm 700 begins by initializing the gain and phase values (Step 702). In one embodiment, the gain and phase values are set to their midpoints. The gain and phase values may, however, be initialized to any values. The initial gain and phase values are assigned to point A, and the power level of the output of the poly-phase filter 510 is measured (Step 704), as described above.

Next, the gain setting is changed, the receiver 500 is given time (e.g., 1 ms) to settle at the new gain setting, and the power level at point B is measured (Step 706). The gain may be changed by a single increment (e.g., 1 unit), as shown in FIG. 8B, or by multiple increments (e.g., 2, 4, 6, or more units). In one embodiment, the gain increment step size is variable and adaptable. If, for example, the change in the output level observed at point B relative to point A is less than a given programmable threshold, the step size may be increased, a new point B chosen, and another output power measurement performed. The point B may thus increase in distance from point A until an appreciable difference in power level is observed. This adaptive step size technique may decrease the search time of the algorithm in, for example, "flat" areas of the three-dimensional representation 800. The phase setting is similarly changed and a power level at point C is determined (Step 708).

Once the points B and C are determined and the power levels at points A, B, and C are measured, the localized slopes of the gain (ΔGain) and phase (ΔPhase) at point A are calculated (Step 710). The localized slopes ΔGain, ΔPhase are then used to determine what, if any, changes are to be made in the gain and phase values (Step 712), and the previous point A is moved to a new point A in accordance with the new values. If, for example, ΔGain is positive (i.e., the power at point B is less than the power at point A) and ΔPhase is negative (i.e., the power at point C is greater than the power at point A), the new point A will be in the south-east corner 808 of the shaded box of FIG. 8B (i.e., toward point B but away from point C) and the gain and phase values adjusted accordingly. In other embodiments, only one of ΔGain and ΔPhase is above a programmable threshold warranting a change. Averaging of successive measurements may be used to improve the accuracy of the image power measurement in the presence of noise.

In one embodiment, the changes made to the gain and phase values correspond to the size of the steps taken to reach points B and/or C. In other embodiments, for very large step sizes, the new point A may be moved only partially toward points B and/or C. If one measured gradient is much greater than the other (e.g., |A−B|>>|A−C|), the smaller adjustment may be ignored (e.g., the new point A may move to point B but not to point C). If a step attempts to overflow the gain and/or phase registers (i.e., move off of the edge of the map in FIG. 8A), the algorithm 700 may detect and correct the attempted step by, for example, setting overflow values to a minimum or maximum allowed value.

In one embodiment, the algorithm 700 compares its current total number of iterations to a predetermined maximum number of iterations (Step 714) and compares the number of previous, successive iterations that have not yielded a reduction in measured power to a predetermined threshold (Step 716). If either comparison is positive, the algorithm assigns the best point so far (in one embodiment, the current position at point A) as the optimal phase and gain coordinates (Step 718) and exits. If both comparisons are negative, the algorithm returns to Step 704 for another iteration.

Figure 9:
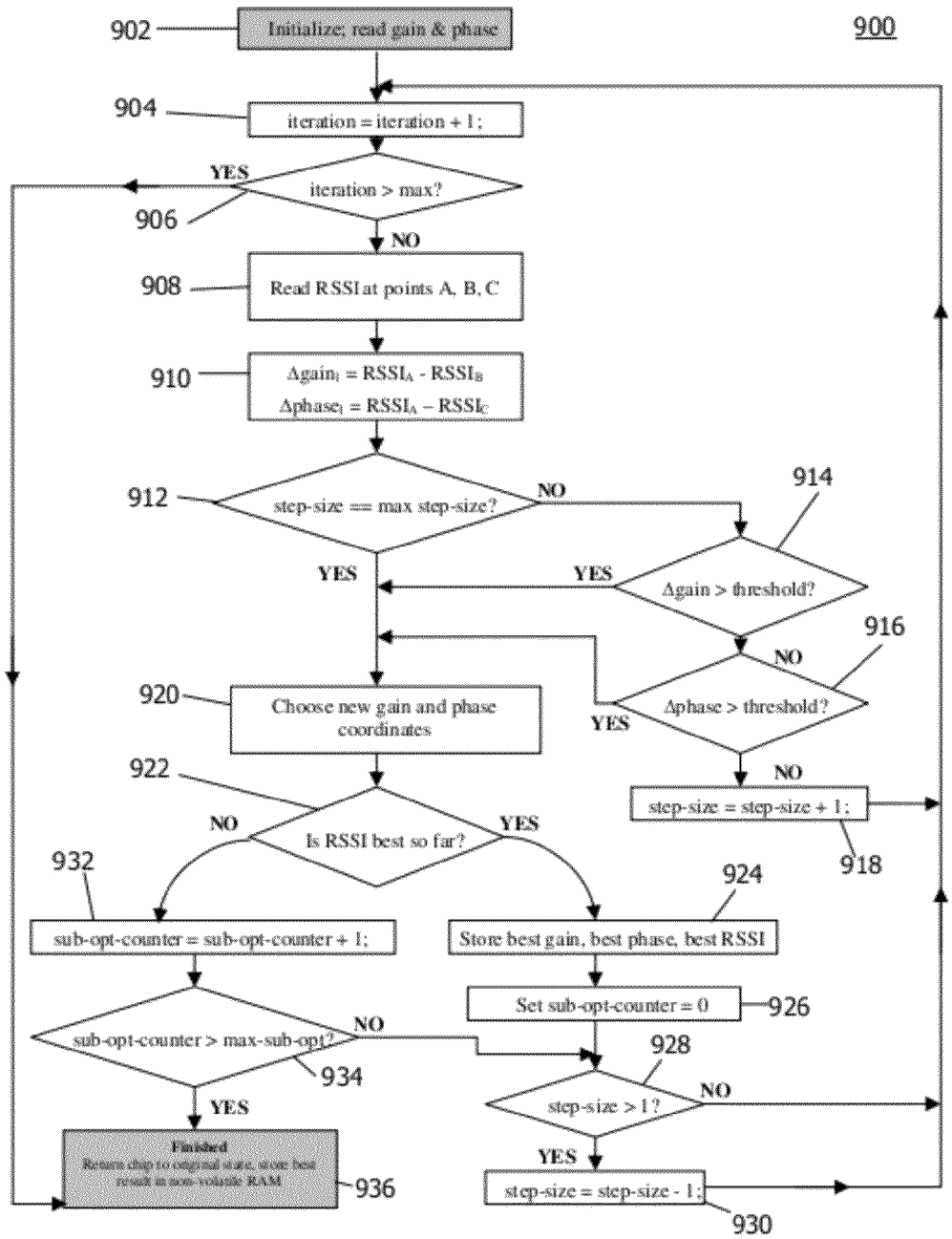
FIG. 9 is a flow chart of another embodiment of an algorithm for gradient estimation.

FIG. 9 illustrates another embodiment 900 of an adaptive IR calibration algorithm. In a first initialization step, the algorithm 900 reads any available gain and phase value data from, for example, a non-volatile RAM (Step 902). An iteration counter is defined and incremented to track the total number of iterations of the algorithm 900 (Step 904). The iteration counter is compared to a predetermined maximum number of iterations (Step 906); the algorithm 900 proceeds only if the maximum number of iterations has not been reached. The RSSI or power output of the poly-phase filter 510 is read at points A, B, and C (Step 908), and gradients between A and B and between A and C are computed to give Δgain and Δphase, respectively (Step 910).

A step-size variable, previously initialized to 1, is used to track the current distance between points A–B and A–C. In one embodiment, separate step-size variables may be used to track each distance independently. The step size is tested against a predetermined programmable maximum step size (Step 912), and, if it is less than the maximum, the differences in Δgain and Δphase are tested to see if they are greater than predetermined programmable thresholds (Steps 914 and 916). The thresholds may be determined by the minimum amount of gain and/or phase difference necessary to distinguish the differences from noise. If both gradients are below their respective thresholds, the step size is incremented (Step 918), and the algorithm returns to Step 904 to take a new measurement at the new step size distance.

If, on the other hand, the step size has reached its maximum or either Δgain or Δphase are greater than their respective thresholds, the calculated gradients are used to choose new gain and phase coordinates (Step 920). The RSSI at the current coordinates is compared to the previously found best (e.g., lowest) RSSI value (Step 922). If the current RSSI measurement is the best (lowest) RSSI, the current gain and phase values are stored along with the RSSI value itself (Step 924). A sub-opt counter, used to track the number of unsuccessful searches for a better RSSI since the last best RSSI coordinate was found, is reset to zero (Step 926).

The step size is examined (Step 928), and, if it is greater than zero, decremented (Step 930). In other embodiments, the step size is decremented by more than one unit or is reset to 1. If the step size is a large number, however, the algorithm 900 is likely at a flat part of the three-dimensional curve 800 illustrated in FIG. 8A, and another measurement at a large step size will likely be necessary to produce gain and phase values greater than the threshold. Too large a step size, however, and the algorithm may miss the steep part of the curve. Once a new step size is chosen, the algorithm loops back to Step 904 for a new measurement.

Returning to Step 922, if the current RSSI value is not the best RSSI value found so far, the sub-opt counter is incremented (Step 932). This situation may arise if the algorithm 900 chooses a new point A that is actually at a higher RSSI value than the previous best point A. The previous point A may be at the minimum power level 802 (as shown in FIG. 8A), in which case any new point A, by definition, will have a higher RSSI. On the other hand, the previous point A may not be at the minimum power level 802 and the new point A was chosen in error. Until the sub-opt counter reaches a maximum programmable value (Step 934), the algorithm 900 will try alternative points around the current point A. Once the maximum of the counter value is reached, the algorithm ends (Step 936). The entire algorithm may take approximately 15 ms to complete using currently available components.

Figure 10:
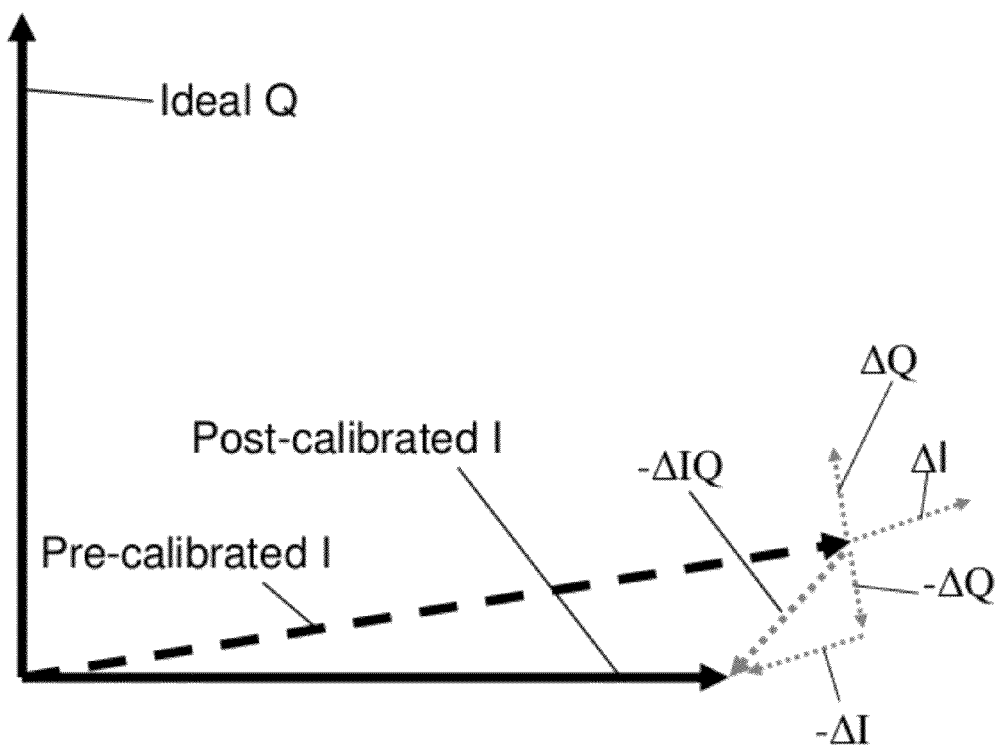
FIG. 10 is a vector diagram of the signal channel components present at the input to the poly-phase filter.

FIG. 10 illustrates a vector-based representation of the gain and phase adjustment performed by the calibration circuit. An ideal Q-channel vector is represented on the y-axis, and, ideally, the I-channel vector lies along the x-axis (i.e., such that the two vectors are equal in magnitude and separated by 90 degrees in phase). In general, this vector configuration represents a filter (such as the poly-phase filter 510) that allows a frequency or band of frequencies to pass without distortion while completely attenuating all other frequencies. In reality, however, filters may distort a signal at a frequency of interest and/or imperfectly attenuate other frequencies due to, for example, imperfections in their components. Other components in the RF receiver 500, such as the mixers 504, 506 and LO 508, may also adversely affect the RF or IF signal quality. These imperfections manifest themselves as changes in the magnitudes and/or phases of the I and Q channel vectors. Any such changes that modify the ideal magnitudes and/or phases of the I and Q vectors degrade the performance of the RF receiver 500. Because the I and Q channel vectors are defined with respect to each other, distortions in both may be represented as changes to a single vector, leaving the other vector unmodified, as represented by the pre-calibrated I vector.

To detect and calibrate for these imperfections, the RF receiver 500 modifies the phase and magnitude of one of the I and Q channel vectors with the gain and phase adjust circuit 524. In one embodiment, as shown in FIG. 10, the Q channel vector is unmodified and the I channel vector is modified in accordance with the coefficients A, B computed by the decoder 540. The variable-gain amplifiers 528 generate ΔI and ΔQ values, and the summer 530 combines them with the original Q channel vector. When the gain and phase adjust circuit 524 is successfully tuned in accordance with the above steps, the resultant post-calibrated vector, I+ΔI+ΔQ, is tuned to coincide with the x-axis (i.e., the ideal I vector), thereby improving the operation of the RF receiver 500. In one embodiment, the I and Q vectors are not perfectly matched for phase and gain to correct for the non-idealities of the filter.

Figure 11A:
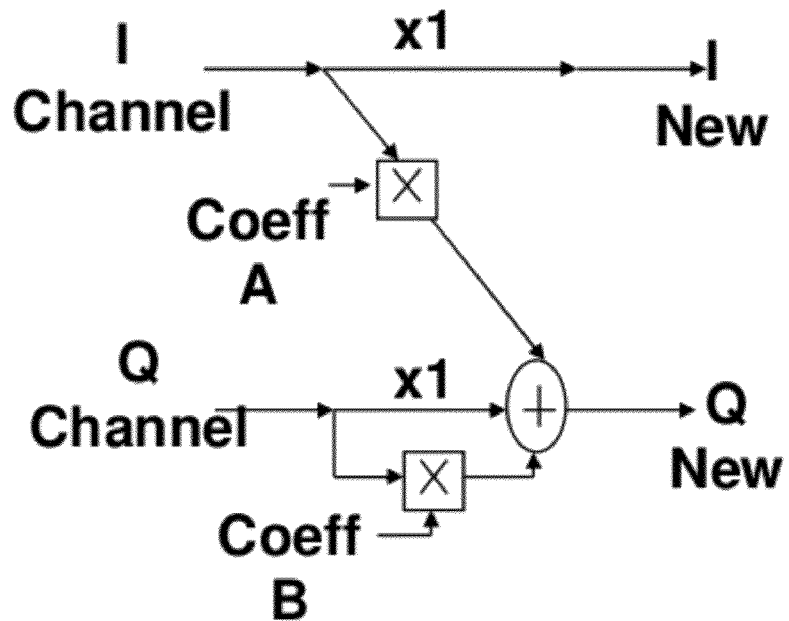
FIGS. 11A and 11B are schematic illustrations of the vector arithmetic performed by the calibration system.
Figure 11B:
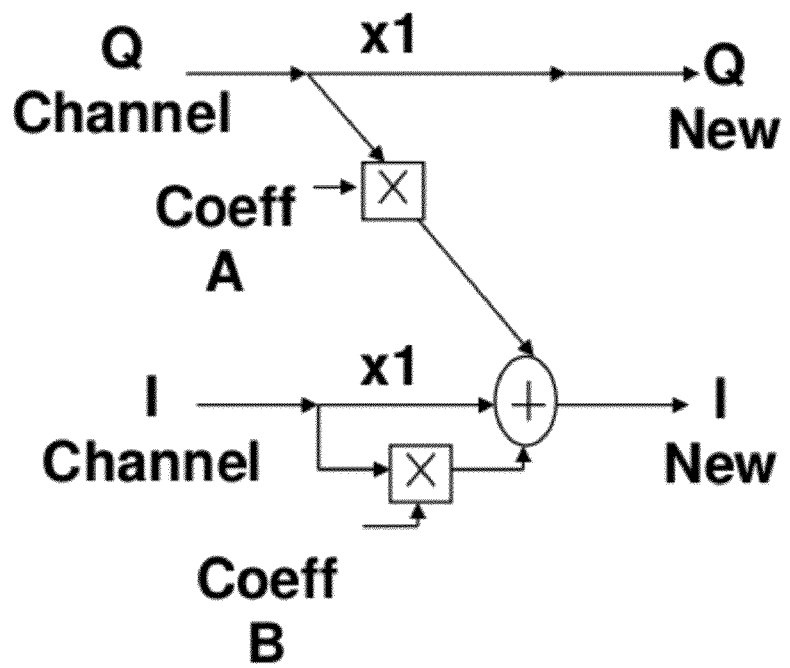

FIGS. 11A and 11B illustrate schematic representations of the vector arithmetic. In FIG. 11A, the new I vector is the same as the original I vector. The new Q vector is the sum of the original Q vector, a copy of the original Q vector (modified by coefficient B), and a copy of the original I vector (modified by coefficient A). FIG. 11B shows that the vector operation is symmetric and that the positions of the I and Q vectors may be reversed without substantially affecting the operation of the calibration system.

Figure 12:
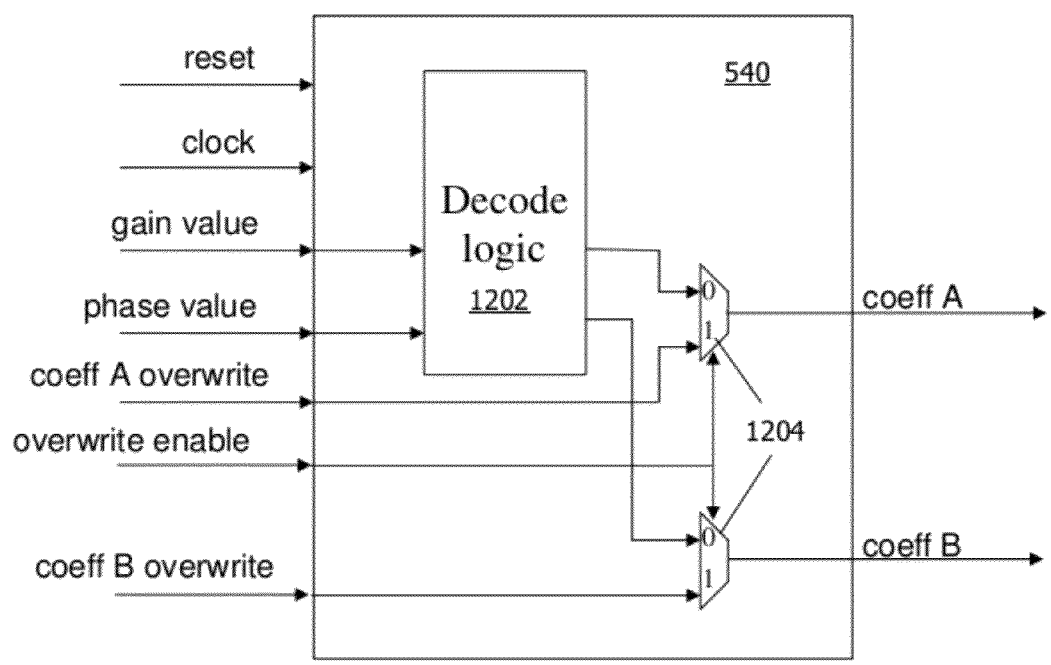
FIG. 12 is a schematic diagram of a decoder.

FIG. 12 illustrates one embodiment of the decoder 540. As described above, the decoder 540 receives digital gain and phase values from the controller 538 and translates them into coefficients A, B for the gain and phase adjust circuit 524. In one embodiment, the gain and phase values are each seven bits long (i.e., six data bits plus one sign bit), but the invention is not limited to any particular number of bits. For the sake of simplicity, however, the operation of the decoder 540 is described herein using seven-bit gain and phase values. Each of the gain and phase values, therefore, may assume one of 128 values, and may be used to generate coefficients A, B having ten bits (i.e., nine data bits and one sign bit). The coefficients A, B may be used to modify the I and Q vectors, as explained above.

The decoder 540 includes decode logic 1202 and multiplexers 1204. The decode logic 1202 receives the gain and phase values and generates coefficients A, B. The decoder 540 also includes an overwrite mode for testing and debugging purposes, triggered by an overwrite enable signal. When enabled, the multiplexers 1204 receive coefficient data directly from the coefficient overwrite codes, bypassing the decode logic 1202 entirely. The decoder 540 may also receive clock and reset signals.

Although the decode logic 1202 may be digitally implemented purely as a look-up table, such an implementation would be prohibitively large in Area. Instead, the coefficients A, B may be generated more efficiently by implementing mathematic and logic functions to derive them from the input gain and phase values. Determining the most efficient equations necessary to generate the coefficients A, B begins with defining the phase difference, Δϕ, and gain difference, Δg:

$$\Delta\phi = \frac{\phi_{max} \times \phi(i)}{N_\phi} \quad (1)$$

and $$\Delta g = 1 + \frac{a_{max} \times a(j)}{N_{amp}} \quad (2)$$

where $a_{max}$ is 0.125, $\phi_{max}$ is 8, $N_\phi$ and $N_{amp}$ are 64, and i and j each range from −64 to 63 in this embodiment. These values may be used to define equations for the coefficients A, B, where $$CoeffA = \Delta g \times \sin(\Delta\phi \times \frac{\pi}{180}) \quad (3)$$

and $$CoeffB = \Delta g \times \cos(\Delta\phi \times \frac{\pi}{180}) - 1 \quad (4)$$

In other embodiments, different equations may be used to calculate the coefficients A, B, as one of skill in the art will understand, and the present invention is not limited to these particular equations.

A straightforward implementation of these equations, however, may produce a large and inefficient design. Operations such as trigonometric functions, inversions, adders, dividers, and multipliers are difficult to implement in hardware and may consume an unacceptable amount of power and area. Instead, certain properties of the above equations may be exploited to greatly reduce the hardware necessary to implement them with no or small cost in accuracy.

For example, regarding coefficient A, the output of equation (3) is symmetric with respect to the ϕ-axis. The output of equation (3) may therefore be divided into two halves: one for the positive phase range (i=0 to 63) and one for the negative phase range (i=−63 to −1). Thus, only one half of the range need be implemented to compute the absolute value of the coefficient A, and the sign bit of the phase value will determine the sign of the coefficient.

In addition, as the gain value j is held constant and the phase value i is varied from −64 to 63, the output of equation (3) varies at regular, linear intervals. Thus, the result of equation (3) may be computed by finding the phase value i offset from zero and extrapolating. To that end, the results of equation (3) at the two extreme gain curves (at i=−64 and i=63) may be calculated in advance (for every gain value j along each curve) and stored in a look-up table in the decode logic 1202. To determine the value of equation (3) at other gain curves (e.g., if i=−63 to 62), the maximum value of equation (3) is found in the look-up table for a particular value of the gain value j, and an offset from the maximum value is computed using the phase value i. In one embodiment, the distance between gain curves is 4, so the offset is 4*i.

$$coeff\ A(g, \varphi_i) = X(g_i, \phi_j) + \frac{X(g_i, \phi_j) \times \phi_i}{N_\phi} \quad (5)$$

or, simplifying, $$coeff\ A(g_i, \varphi_i) = \frac{X(g_i, \phi_j) \times 64 + X(g_i, \phi_j) \times \phi_i}{64} \quad (6)$$

where $X(g_i,\phi_j)$ is the value found in the coefficient A look-up table. If ϕ is less than zero, j=−64 (i.e., the value of the gain curve at the lower extreme is referenced); if ϕ is greater than or equal to zero, j=63 (i.e., the value of the gain curve at the higher extreme is referenced). The equation for coefficient B is given as:

$$coeff\ B(g_i,\phi_i)=Y(g_i,\phi_j)+4(g_i+64) \quad (7)$$

where $Y(g_i,\phi_i)$ is the value found in the coefficient B look-up table and j=−64 to 63.

The calculation of coefficients A and B with equations (6) and (7) requires only addition and multiplication by powers of two, which may be easily implemented with shift registers.

Figure 13:
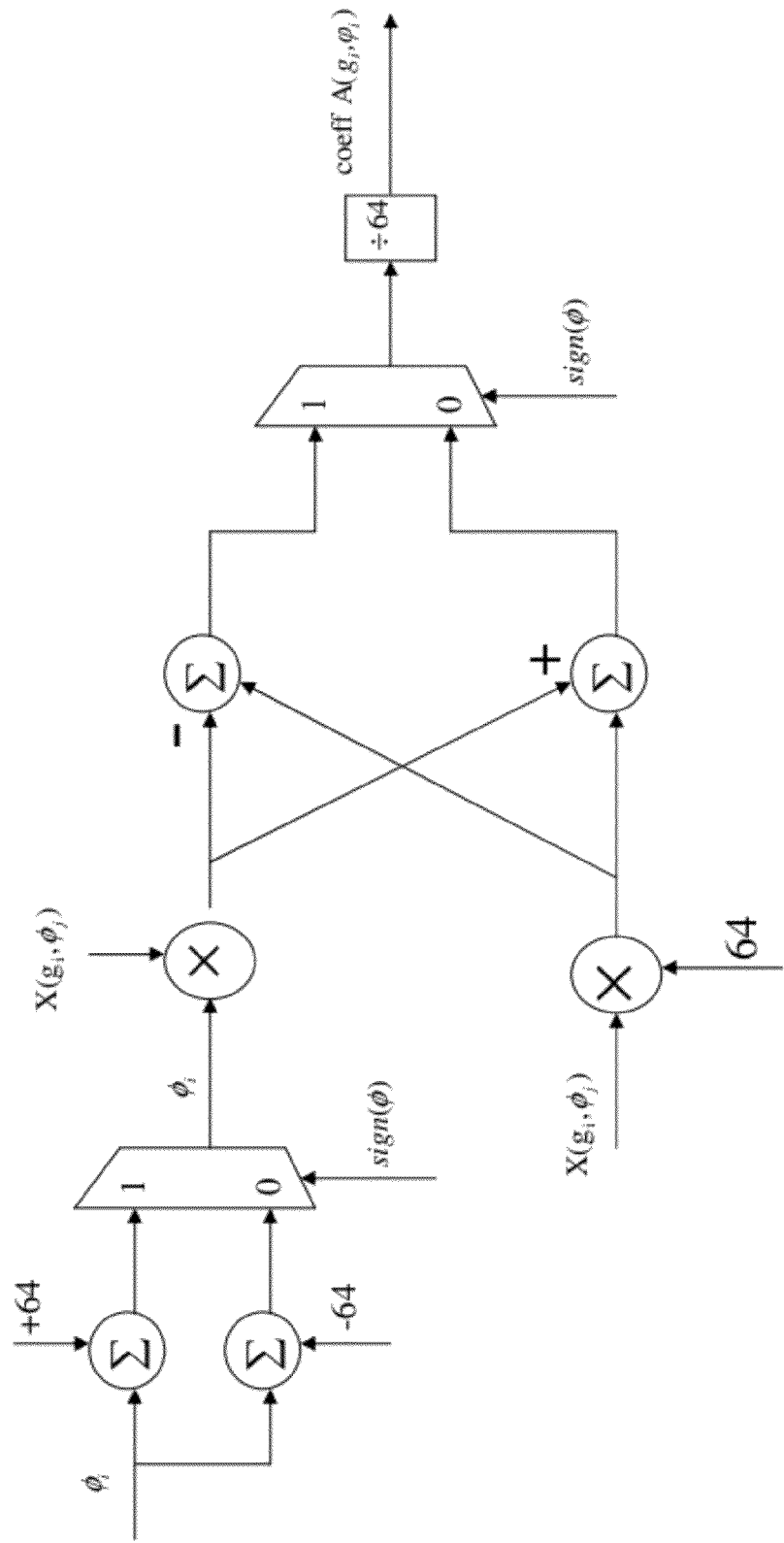
FIGS. 13 and 14 are schematic diagrams of circuits generating I and Q vector calibration coefficients.
Figure 14:
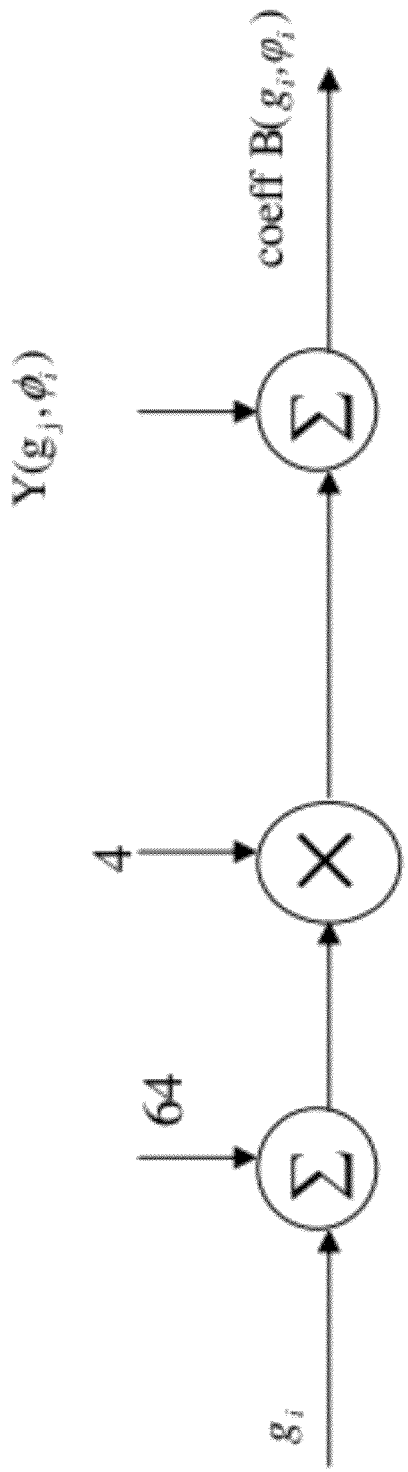

These optimizations may thus greatly reduce the number of logic gates required to implement the decode logic 1202 from approximately 60,000 gates to approximately 1,300 gates. Hardware implementations of equations (6) and (7) are shown in FIGS. 13 and 14, respectively.

Figure 15:
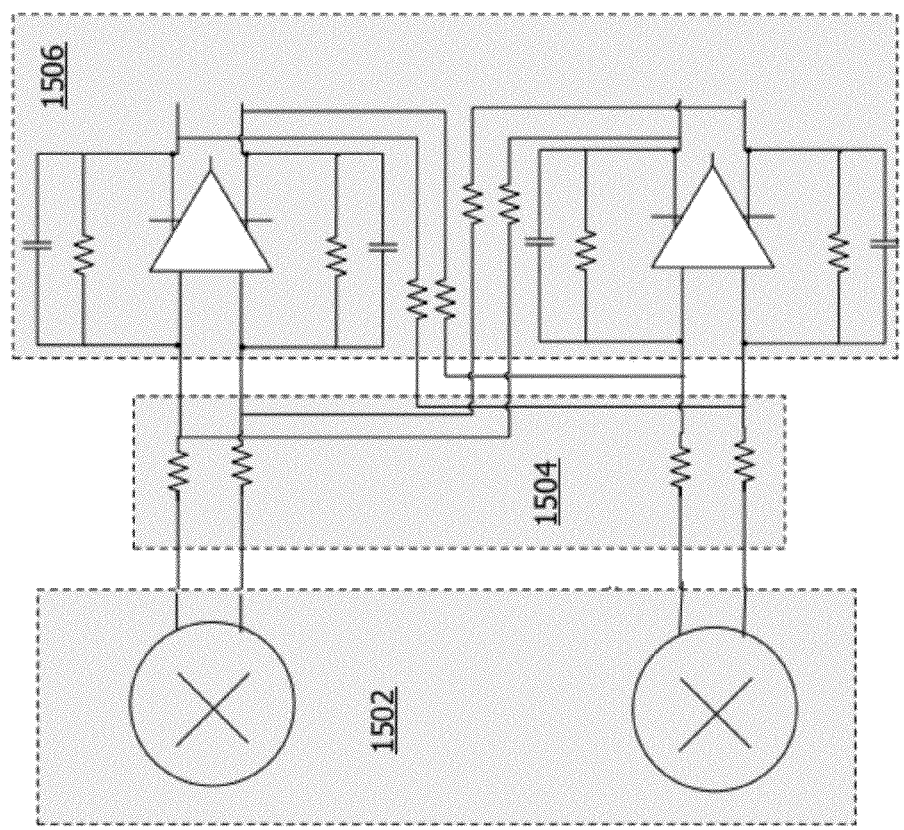
FIGS. 15, 16, and 17 are schematic diagrams of gain and phase adjust circuits.
Figure 16:
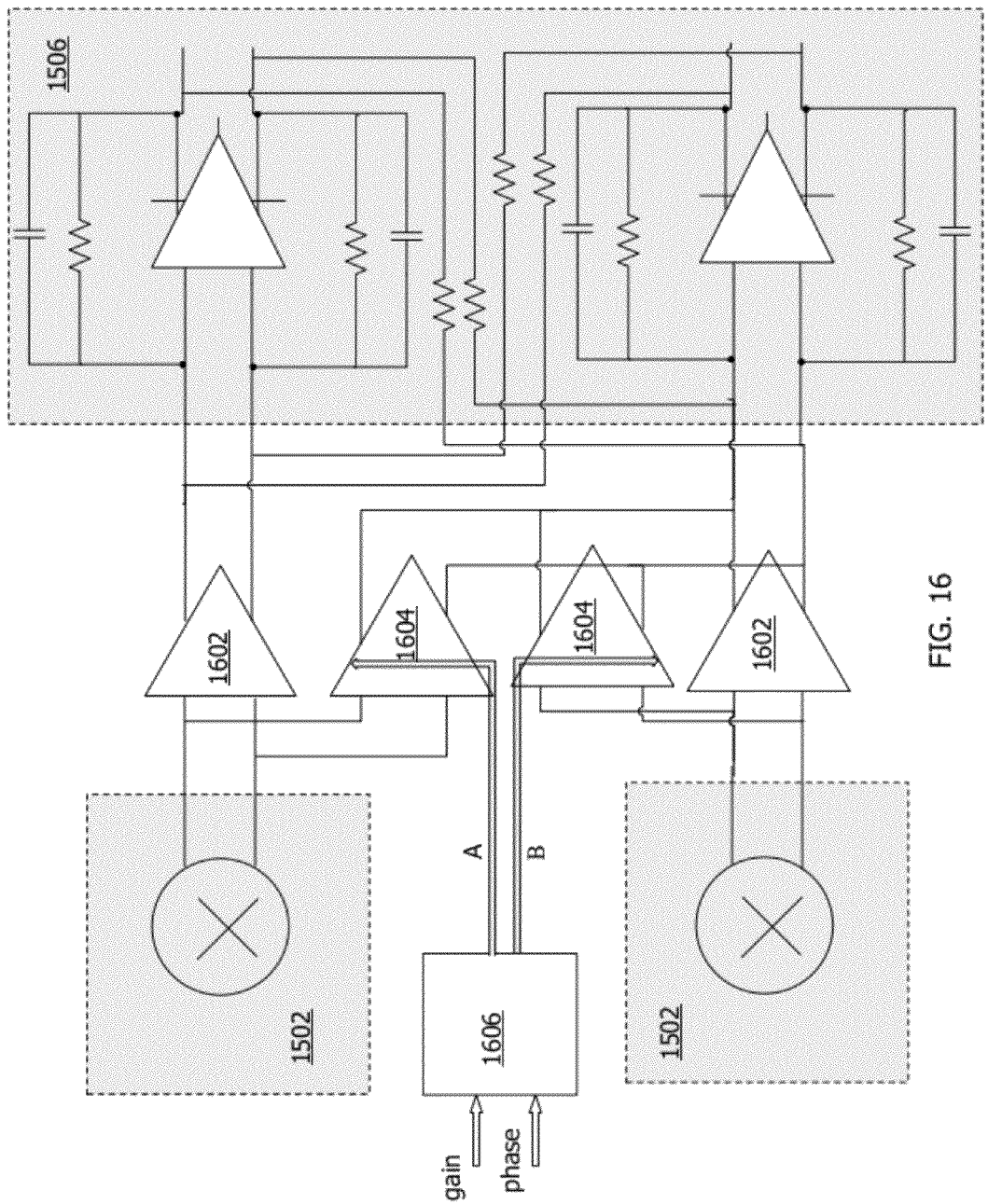
Figure 17:
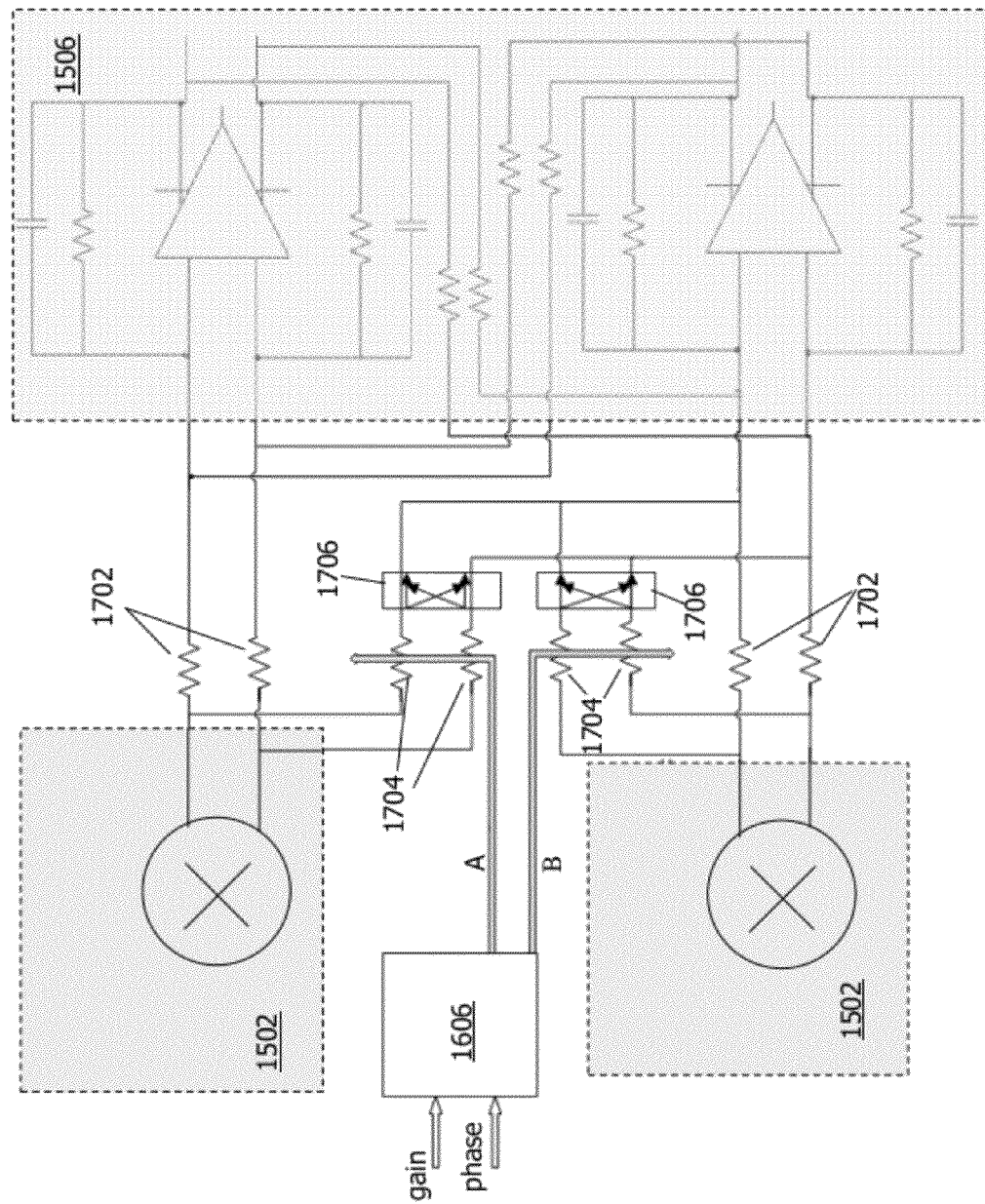

FIGS. 15, 16, and 17 illustrate various implementations of the gain and phase adjust circuit 524. FIG. 15 includes mixers 1502, a mixer-to-filter interface 1504, and the first stage 1506 of a multi-stage poly-phase filter. In one embodiment, translation circuits at the outputs of the mixers 1502 translate current-mode signals into voltage-mode signals. In this embodiment, the I and Q channel signals are generated by the resistors in the mixer-to-filter interface 1504.

FIG. 16 is a more detailed view of the circuit introduced in FIG. 15. The resistors in the mixer-to-filter interface 1504 have been replaced with fixed-gain amplifiers 1602 and variable-gain amplifiers 1604. The variable-gain amplifiers 1604 are controlled by coefficients A, B produced from gain and phase values received by a digital decoder 1606. As described above, the digital decoder 1606 may be bypassed during normal operation.

FIG. 17 illustrates another implementation of the gain and phase adjust circuit 524. Resistors 1702 may be used to implement the fixed-gain amplifiers 1602 and variable resistive elements 1704 (controlled by the decoder 1606) may be used to implement the variable-gain amplifiers 1604. Phase-change elements 1706 may adjust the phase of the incoming signal (e.g., multiply the phase by −1).

Figure 18:
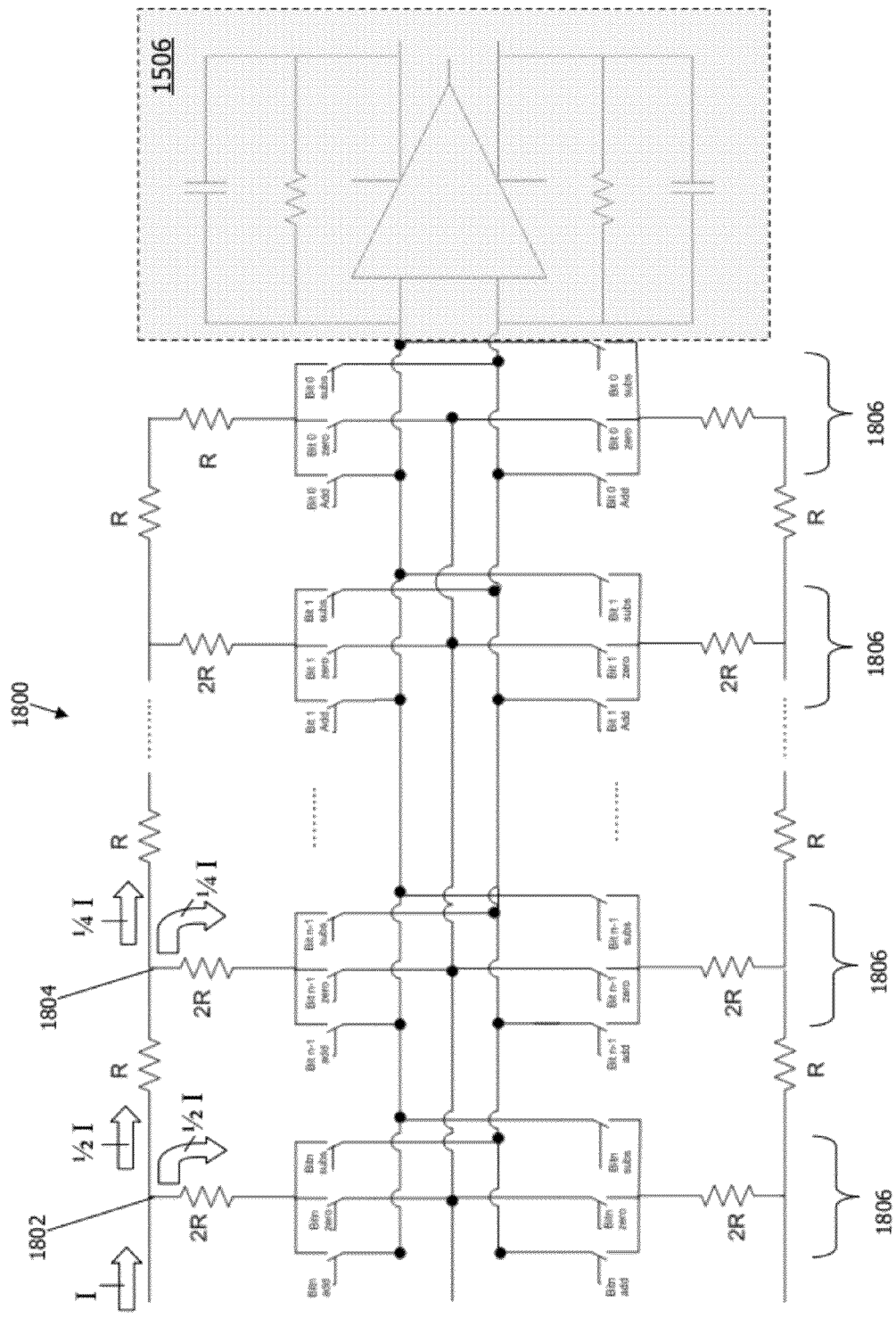
FIG. 18 is a schematic diagram of a passive analog multiplier.

FIG. 18 illustrates a more detailed implementation of the variable-gain amplifier 1604. The circuit uses a passive analog multiplier circuit that receives a voltage V from a mixer output and produces a corresponding current I. In one embodiment, the passive analog multiplier circuit is an "R2R" resistor ladder network 1800, but the multiplier circuit may be implemented with any appropriate passive analog multiplier, as one of skill in the art will understand. In this embodiment, at each node in the ladder 1800, the resistors are configured to divide the current into equal halves. For example, at the first node 1802, the current I is divided into ½ I and ½ I. At the second node 1804, the remaining current is divided into half again into ¼ I and ¼ I portions, and so on down the resistor ladder 1800. In other embodiments, other resistor fractions are used. At each rung 1806 of the ladder, a three-state control bit decides if the divided current should be ignored, added to, or subtracted to the output current. The control bits may be generated from, for example, the coefficients A, B. The number of rungs 1806 of the ladder 1800 corresponds to the number of bits of the ladder 1800. The ladder 1800 may have any number of rungs/bits and, in general, may be described as an n-bit ladder. Each rung may have three states: bit-n add, bit-n subtract, and bit-n zero.

In various embodiments, the image-rejection calibration systems described herein are used in RF applications requiring a high-quality, low-power RF receiver. In particular, the image-rejection calibration system may be used in battery-operated portable electronic devices such as cellular phones, smartphones, personal digital assistants, GPS receivers, laptop computers, notebook computers, and/or netbook computers. The image-rejection calibration system may also be used, however, in any application requiring a robust, high-quality receiver. For example, the image-rejection calibration system may be used to compensate for fluctuations in a RF application produced by variations in temperature. Other applications include receivers for wireless metering systems that transmit, e.g., utility usage information from a point of use to a central station; receivers used to remotely control home amenities systems such as window blinds or smoke alarms; and/or wireless sensor networks.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for calibrating image rejection of a receiver, the system comprising:
   an analog circuit element configured to modify the gain and phase of a baseband image signal in accordance with a control signal so as to produce a corrected image signal, wherein the baseband image signal comprises an in-phase signal and a quadrature signal;
   an image-rejection filter configured to receive the corrected image signal and to produce a filtered image signal based thereon;
   a power measurement circuit configured to determine a power level of the filtered image signal;
   a controller configured to analyze the power level and to generate a gain value and a phase value based on the power level analysis; and
   a decoder configured to generate the control signal, wherein the decoder is configured to decode the gain value and the phase value into a first coefficient of the control signal for control of a magnitude of the in-phase signal by the analog circuit element, and wherein the decoder is configured to decode the gain value and the phase value into a second coefficient of the control signal for control of a magnitude of the quadrature signal by the analog circuit element.

2. The system of claim 1, wherein the first and second coefficients have a first bit length and the gain and phase signals have a second bit length less than the first bit length.

3. A system for calibrating image rejection of a receiver, the system comprising:
   an analog circuit element for modifying the gain and phase of a baseband image signal in accordance with a received control signal so as to produce a corrected image signal;
   an image-rejection filter for receiving the corrected image signal and for producing a filtered image signal based thereon;
   a power measurement circuit for determining a power level of the filtered image signal;
   a controller for analyzing the power level and for altering the control signal based on the power level analysis, thereby reducing the power level of the filtered image signal;
   a decoder for receiving gain and phase values and for generating the control signal; and
   a decoder bypass circuit for bypassing the decoder.

4. A system for calibrating image rejection of a receiver, the system comprising:
   an analog circuit element for modifying the gain and phase of a baseband image signal in accordance with a received control signal so as to produce a corrected image signal;

an image-rejection filter for receiving the corrected image signal and for producing a filtered image signal based thereon;

a power measurement circuit for determining a power level of the filtered image signal;

a controller for analyzing the power level and for altering the control signal based on the power level analysis, thereby reducing the power level of the filtered image signal; and a decoder for receiving gain and phase values and for generating the control signal, wherein the decoder comprises a look-up table.

5. The system of claim 4, wherein the decoder extrapolates between entries in the look-up table.

6. The system of claim 1, wherein the controller comprises a gradient estimation algorithm.

7. A system for calibrating image rejection of a receiver, the system comprising:

an analog circuit element for modifying the gain and phase of a baseband image signal in accordance with a received control signal so as to produce a corrected image signal;

an image-rejection filter for receiving the corrected image signal and for producing a filtered image signal based thereon;

a power measurement circuit for determining a power level of the filtered image signal; and a controller for analyzing the power level and for altering the control signal based on the power level analysis, thereby reducing the power level of the filtered image signal, wherein the controller comprises a gradient estimation algorithm, and wherein the gradient estimation algorithm comprises an adaptive step size.

8. A system for calibrating image rejection of a receiver, the system comprising:

an analog circuit element for modifying the gain and phase of a baseband image signal in accordance with a received control signal so as to produce a corrected image signal;

an image-rejection filter for receiving the corrected image signal and for producing a filtered image signal based thereon;

a power measurement circuit for determining a power level of the filtered image signal; and a controller for analyzing the power level and for altering the control signal based on the power level analysis, thereby reducing the power level of the filtered image signal, wherein the analog circuit element comprises a passive analog multiplier.

9. The system of claim 8, wherein the passive analog multiplier comprises a three-state, n-bit R2R resistor ladder.

10. The system of claim 1, further comprising a frequency source for providing a calibration signal.

11. The system of claim 10, wherein the frequency source comprises a digital divider and at least one of a high-pass filter or a band-pass filter.

12. The system of claim 10, further comprising a mixer configured to mix the calibration signal with a local oscillator signal to generate the image signal.

13. The system of claim 1, wherein the image-rejection filter is a poly-phase filter.

14. The system of claim 1, wherein the analog circuit element is configured to receive a reference frequency from one of a crystal oscillator, a programmable clock divider, an RF synthesizer, or a heterodyne circuit.

15. A system for calibrating image rejection of a receiver, the system comprising:

an image-rejection correction circuit for modifying the gain and phase of a first channel of a baseband image signal, the image-correction circuit comprising:

a first variable-gain element for receiving the first channel of the image signal and for generating a first correction signal in accordance with a received control signal;

a second variable-gain element for receiving a second channel of the image signal and for generating a second correction signal in accordance with the received control signal; and a summing circuit for summing the first channel, first correction signal, and second correction signal, thereby generating a corrected first channel of the image signal;

an image-rejection filter for receiving the corrected first channel of the image signal and the second channel of the image signal, the image-rejection filter producing a filtered image signal;

a power measurement circuit for determining a power level of the filtered image signal; and a controller for analyzing the power level and for altering the control signal based on the power level analysis, thereby reducing the power level of the filtered image signal.

16. The system of claim 15, wherein the first channel of the image signal is one of an I channel and a Q channel.

17. The system of claim 15, wherein the first and second variable-gain elements comprise a passive analog multiplier.

18. The system of claim 17, wherein the R2R resistor ladder is a three-state, n-bit R2R resistor ladder.

19. A method for calibrating image rejection of a receiver, the method comprising:

sensing a power level of a filtered image signal produced by an image-rejection filter to generate a phase value and a gain value;

generating a control signal based on the phase value and the gain value, wherein generating the control signal comprises decoding the gain and phase values into a first coefficient of the control signal and decoding the gain and phase values into a second coefficient of the control signal;

modifying an analog circuit element in accordance with the control signal, the analog circuit element receiving a baseband image signal and producing a corrected image signal, wherein producing the corrected image signal comprises controlling a magnitude of a quadrature signal of the baseband image signal based on the first coefficient and controlling a magnitude of an in-phase signal of the baseband image signal based on the second coefficient; and receiving, at the image-rejection filter, the corrected image signal, wherein modifying the analog circuit element reduces the power level of the filtered image signal.

20. The method of claim 19, wherein generating the control signal comprises estimating the gradient of the power level.

21. A method for calibrating image rejection of a receiver, the method comprising:

sensing a power level of a filtered image signal produced by an image-rejection filter;

generating a control signal based on the power level of the filtered image signal;

modifying an analog circuit element in accordance with the control signal, the analog circuit element receiving a baseband image signal and producing a corrected image signal; and receiving, at the image-rejection filter, the corrected image signal, wherein modifying the analog circuit element reduces the power level of the filtered image signal, and wherein generating the control signal comprises estimating the gradient of the power level, and wherein estimating the gradient comprises adapting a step size.

22. A method for calibrating image rejection of a receiver, the method comprising:

sensing a power level of a filtered image signal produced by an image-rejection filter;

generating a control signal based on the power level of the filtered image signal;

modifying an analog circuit element in accordance with the control signal, the analog circuit element receiving a baseband image signal and producing a corrected image signal; and receiving, at the image-rejection filter, the corrected image signal, wherein modifying the analog circuit element reduces the power level of the filtered image signal, and wherein generating the control signal comprises looking up a value in a look-up table.

23. The method of claim 22, wherein generating the control signal comprises extrapolating between look-up table entries.

24. An electronic device comprising an RF receiver having a system for calibrating image rejection, the receiver comprising:

an analog circuit element configured to modify the gain and phase of a baseband image signal in accordance with a control signal so as to generate a corrected image signal, wherein the baseband image signal comprises an in-phase signal and a quadrature signal;

an image-rejection filter configured to receive the corrected channel image signal and to generate a filtered image signal based thereon;

a power measurement circuit configured to determine a power level of the filtered image signal;

a controller configured to analyze the power level and to generate a gain value and a phase value based on the power level analysis; and a decoder configured to generate the control signal, wherein the decoder is configured to decode the gain value and the phase value into a first coefficient of the control signal for control of a magnitude of the in-phase signal by the analog circuit element, and wherein the decoder is configured to decode the gain value and the phase value into a second coefficient of the control signal for control of a magnitude of the quadrature signal by the analog circuit element.

* * * * *